June 7, 1949.  D. L. PHILLIPS  2,472,677
DRAIN COCK
Filed June 4, 1945
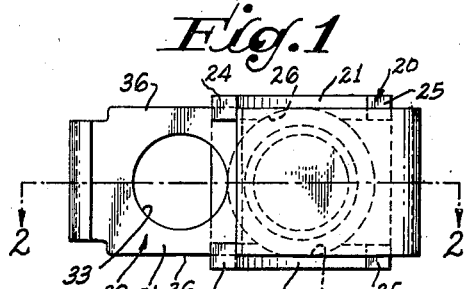
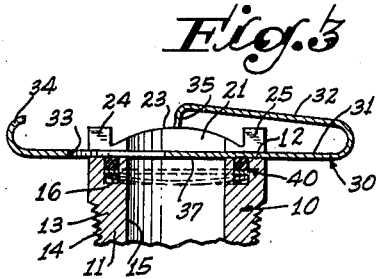
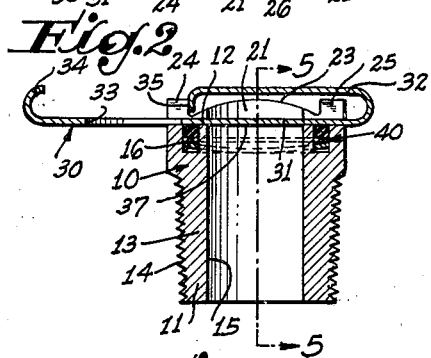
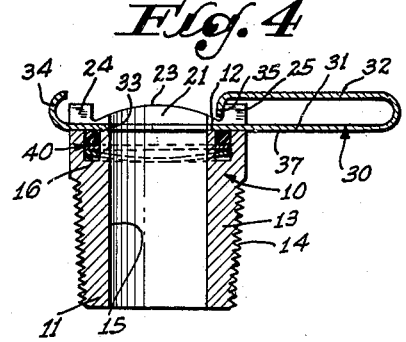
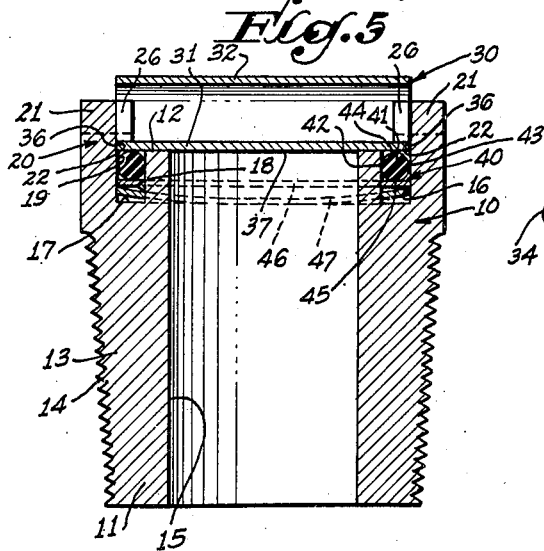
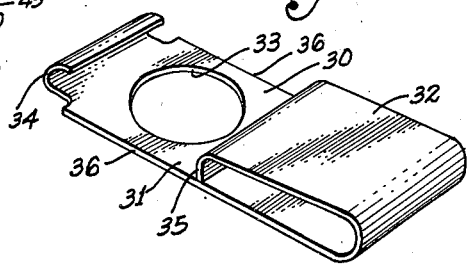
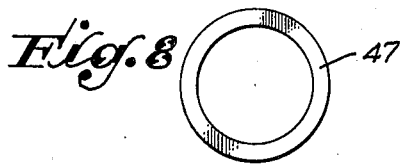
INVENTOR
DELBERT L. PHILLIPS
BY
HARRIS, KIECH, FOSTER & HARRIS
FOR THE FIRM
ATTORNEYS Patented June 7, 1949

2,472,677

UNITED STATES PATENT OFFICE 2,472,677

DRAIN COCK

Delbert L. Phillips, Culver City, Calif., assignor to William R. Whittaker, William S. Whittaker, Beulah Whittaker, Robert M. Vandegrift, Roger D. Vandegrift, and Delbert L. Phillips, copartners doing business as Wm. R. Whittaker Co., Ltd., Los Angeles, Calif.

Application June 4, 1945, Serial No. 597,503

7 Claims. (Cl. 251—51)

My invention relates to valves, and more specifically to a device of this general character which is particularly adapted for application to a fluid container to provide a means for controlling drainage thereof as desired, although the device may, in many instances, be adapted for employment in lieu of various conventional valves in less specialized applications. A primary object of my invention is the provision of a simple and inexpensive valve, or drain cock which is adapted for rapid and facile operation with greater sealing efficiency.

My invention includes a slidable plate provided with a port adapted for registry with a passage through a tubular housing element and incorporates a novel means for achieving positive sealing action. Many of the conventional valves of this nature have been designed with such emphasis on simplicity of construction that the sealing action of the resulting contrivance is erratic and unreliable, especially when used with fluids of low viscosity. Other conventional valves of the slidable-plate type have achieved adequate sealing efficiency through the employment of complex combinations of closely machined components, the deleterious effect of corrosion and accumulations of foreign matter on such machined surfaces being well known in the art. The sealing action of such valves, ordinarily achieved by disposing accurately machined, complementary metallic surfaces co-adjacently to prevent passage of fluid therebetween, is materially impaired by the pitting of the surfaces, a consequence of the corrosive action of many fluids. Accumulations of foreign matter, such as products of corrosion, gritty substances carried by the fluid, etc., tend to score the machined surfaces, thereby further reducing the sealing efficiency, and excessive deposits may result in freezing of the valve.

An important purpose of my invention, therefore, is the provision of a simple and effective means for achieving positive sealing action which is sufficiently flexible and resilient to accommodate any reasonable irregularities of the sealing surfaces to compensate for the effects of corrosive action.

Another object of my invention is to provide a drain cock of the slidable-plate type whose operation is relatively unaffected by corrosion and accumulations of foreign material.

A further object of my invention is the provision of a positive means for establishing the open and closed positions of the drain cock to prevent creep during vibration.

Another purpose of my invention is the provision of a drain cock adaptable for application to the drain holes of various conventional fluid containers.

An additional object of my invention is to provide an inexpensive sealing element which is readily replaceable.

Further objects and advantages of my invention will be made evident in the following description thereof and a complete comprehension of the invention may best be achieved by a consideration of the preferred embodiment thereof illustrated in the accompanying drawing, in which:

Fig. 1 represents a plan view of my invention and illustrates the drain cock in the closed position;

Fig. 2 is an elevational sectional view taken on the line 2—2 of Fig. 1, and illustrates the closed position;

Fig. 3 is an elevational view similar to Fig. 2, but illustrates an intermediate position;

Fig. 4 is an elevational view similar to Fig. 2, but illustrates the open position;

Fig. 5 represents an enlarged elevational view in section along the line 5—5 of Fig. 2;

Fig. 6 is a perspective view of a slidable-plate which forms one component of the drain cock;

Fig. 7 is a side view of a transversely-arcuated annular washer forming one component of a sealing means; and Fig. 8 is a plan view of the washer illustrated in Fig. 7.

The drain cock in general comprises a housing element or valve body 10, a slidable porting plate or valve member 30, and a sealing means 40. The housing element 10 preferably comprises a substantially cylindrical stem 11 which terminates in a substantially square transverse member 20 disposed adjacent one end face 12 of the stem 11. A portion 13 of the stem 11 is preferably provided with external threads 14 to permit application of the stem 11 to the internally threaded drain hole of a fluid container (not shown). The housing 10 is provided with longitudinal, circular fluid passage or bore 15 therethrough and a circular annular groove 16 in the end face 12 thereof substantially adjacent and concentric with the bore 15, the groove 16 being embraced by a base wall 17, an inner peripheral wall 18, and an outer peripheral wall 19, as best shown in Fig. 5.

The transverse member 20 is provided with a pair of projecting, parallel, transverse ribs or shoulders 21 thereon adjacent opposite sides thereof, the inner surfaces of the shoulders 21 being recessed substantially adjacent the end face 12 of the stem 11 to provide a pair of parallel, transverse slots 22 therein which serve as a guide for the slidable valve member 30 as best shown in Fig. 5. Each shoulder 21 is provided with an arcuate central portion 23 and projecting end portions 24 and 25, as best shown in Fig. 2, which act as stops as will be discussed in detail hereinafter. As illustrated, a portion 26 of the inner surface of the shoulders 21 also forms part of the peripheral wall of the groove 16.

Referring particularly to Fig. 6, the porting plate 30, preferably formed of a resilient material such as spring steel, is generally V-shaped and includes a pair of substantially parallel arms 31 and 32, the arm 31 being provided with a circular port 33 therethrough of substantially the same diameter as the bore 15. The free end 34 of the arm 31 is preferably curved inwardly as illustrated to provide a convenient means for actuating the porting plate 30, as will be described hereinafter, and the free end 35 of the arm 32 is also curved inwardly. When assembled, the lateral edges 36 of the arm 31 are slidably disposed in the transverse slots 22 in the member 20, as best shown in Fig. 5. The porting plate 30 may be translated transversely relative to the stem 11 by a force applied to the free end 34, which serves as an actuating member, to cause the port 33 to register with the bore 15, as shown in Fig. 4, thereby opening the drain cock; or the porting plate 30 may be moved in the opposite direction to bring the port 33 and bore 15 out of registry, as best shown in Fig. 2, thereby closing the drain cock. The free end 35 of the arm 32 slidably engages and moves along the arcuate portions 23 of the shoulders 21 and engages the stops 24 and 25 at either end of its travel to limit the translation of the porting plate 30 when the latter reaches the closed or open position, respectively. Since the porting plate 30 is preferably made of a resilient material, the spring action of the arm 32 urges the free end 35 thereof into positive engagement with the arcuate portions 23 of the shoulders 21 at all times to prevent any creeping of the porting plate 30 from the desired position when the drain cock is subjected to vibration.

Disposed in the annular groove 16 adjacent the surface 37 of the arm 31 of the porting plate 30 is an annular sealing element 41, preferably formed of rubber or a similarly flexible and resilient material, such as, for example, an O-type ring as is well known in the art, the inner periphery 42 of the sealing element 41 being adapted to engage the inner peripheral wall 18 of the groove 16, the outer periphery 43 being adapted for engagement with the outer peripheral wall 19 thereof, and one side 44 being in contact with the surface 37 of the arm 31. A plane annular washer 46 is disposed in the groove 16 adjacent the sealing element 41 and is adapted for engagement with one side 45 thereof. A transversely-arcuated, resilient annular washer 47, best shown in Figs. 7 and 8, is also disposed in the groove 16 between the plane washer 46 and the base wall 17 of the groove 16. Upon assembly, the arcuated washer 47 is deflected to permit accommodation of the plane washer 46 and the sealing element 41 in the groove 16, the initial deflection serving to urge the plane washer 46 into engagement with the sealing element 41, whereby the sealing element 41 is compressed, and engages the peripheral walls 18 and 19 of the groove 16 and the surface 37 of the porting plate 30 to effect a positive seal therebetween.

The drain cock is of extremely simple construction and may be opened or closed readily by sliding the porting plate 30 into the desired position by means of a force applied by the fingertips of an operator to the free end 34 of the arm 31, the sealing element 41 effecting a complete and positive fluid-tight seal between the housing element 10 and the porting plate 30. Any corrosion deposits or accumulations of foreign matter on the surface 37 of the porting plate 30 will not materially interfere with the sealing efficiency, since the sealing element 41 tends to deflect to accommodate such deposits or accumulations. As the porting plate 30 is displaced during operation of the drain cock, the sealing element 41 tends to remove, or wipe off accumulations of foreign material deposited on the surface 37 of the porting plate 30.

The engagement of the free end 35 of the porting-plate arm 32 with the arcuate portions 23 of the shoulders 21 provides a reliable safety device for preventing inadvertent operation of the drain cock and further prevents creeping of the porting plate 30 when vibration exists, by virtue of the increasing force exerted by the segment 32 as the porting plate 30 is moved toward an intermediate position. The threaded portion 14 of the stem 11 is preferably of a suitable standard size to permit threaded engagement thereof with a conventional drain hole, a pipe coupling, or a standard adapter as is well known in the art.

It will be understood that although I have herein disclosed a specific embodiment of my invention which is particularly adapted for employment as a drain cock disposed adjacent the drain hole of a fluid container or adjacent an end of a fluid conducting member, those skilled in the art will immediately recognize the applicability of my inventive concept to a location intermediate the ends of a fluid conducting member. I do not intend, therefore, to be limited to the specific disclosure contained herein and reserve the right to all the substitutions for and modifications of my inventive concept that properly come within the scope of the appended claims.

I claim as my invention:

1. In a device of the character described, the combination of: a valve body provided with a passage and provided with a guide defining a plane which traverses said passage; a rib on said body, said rib being parallel to said guide and having a surface arched in a direction perpendicular to said plane; a plate slidable in said guide transversely of said passage to vary the extent of opening of said passage; and means carried by said plate and slidably engaging said arched surface for releasably retaining said plate in any desired position in said guide.

2. In a device of the character described, the combination of: a valve body provided with a passage and provided with a guide extending transversely of said passage; an arcuate rib on said valve body, said rib being substantially parallel to said guide and having a surface arched in a direction substantially perpendicular thereto; and a plate movable along said guide transversely of said passage to vary the extent of opening of said passage, said plate having an arm which is slidable along said arched surface.

3. A device as set forth in claim 2 including a stop on said valve body at each end of said rib.

4. In a device of the character described, the combination of: a valve body provided with a passage and provided with a guide extending transversely of said passage; a pair of arcuate ribs on said valve body extending transversely of said passage and located on opposite sides thereof, said ribs being parallel to said guide and having surfaces arched in a direction perpendicular thereto; and a resilient, generally U-shaped valve member provided with a first, plane arm which is slidable in said guide transversely of said passage to vary the extent of opening of said passage, and provided with a second arm which is generally parallel to said first arm and which slidably engages said arched surfaces.

5. A device as set forth in claim 4 wherein said ribs provide parallel walls on opposite sides of said passage, said walls having slots therein which form said guide.

6. A device according to claim 4 wherein said valve body is provided with an abutment at each end of each of said arcuate ribs.

7. A device as set forth in claim 4 wherein said valve body is provided with an annular groove which is concentric with and spaced from said passage, said device being provided with resilient means disposed in said annular groove and including an annular sealing element engaging said first arm and said valve body for providing a fluidtight seal between said first arm and said valve body.

DELBERT L. PHILLIPS.

REFERENCES CITED

The following references are of record in the file of this patent:

UNITED STATES PATENTS

| Number | Name | Date |
|---|---|---|
| 226,266 | Bergstresser | Apr. 6, 1880 |
| 992,293 | Thomason | May 16, 1911 |
| 2,001,627 | Nenstiehl | May 14, 1935 |
| 2,357,232 | Snyder | Aug. 29, 1944 |

FOREIGN PATENTS

| Number | Country | Date |
|---|---|---|
| 193,418 | Switzerland | Mar. 1, 1938 |